United States Patent Office 3,143,932
Patented Aug. 11, 1964

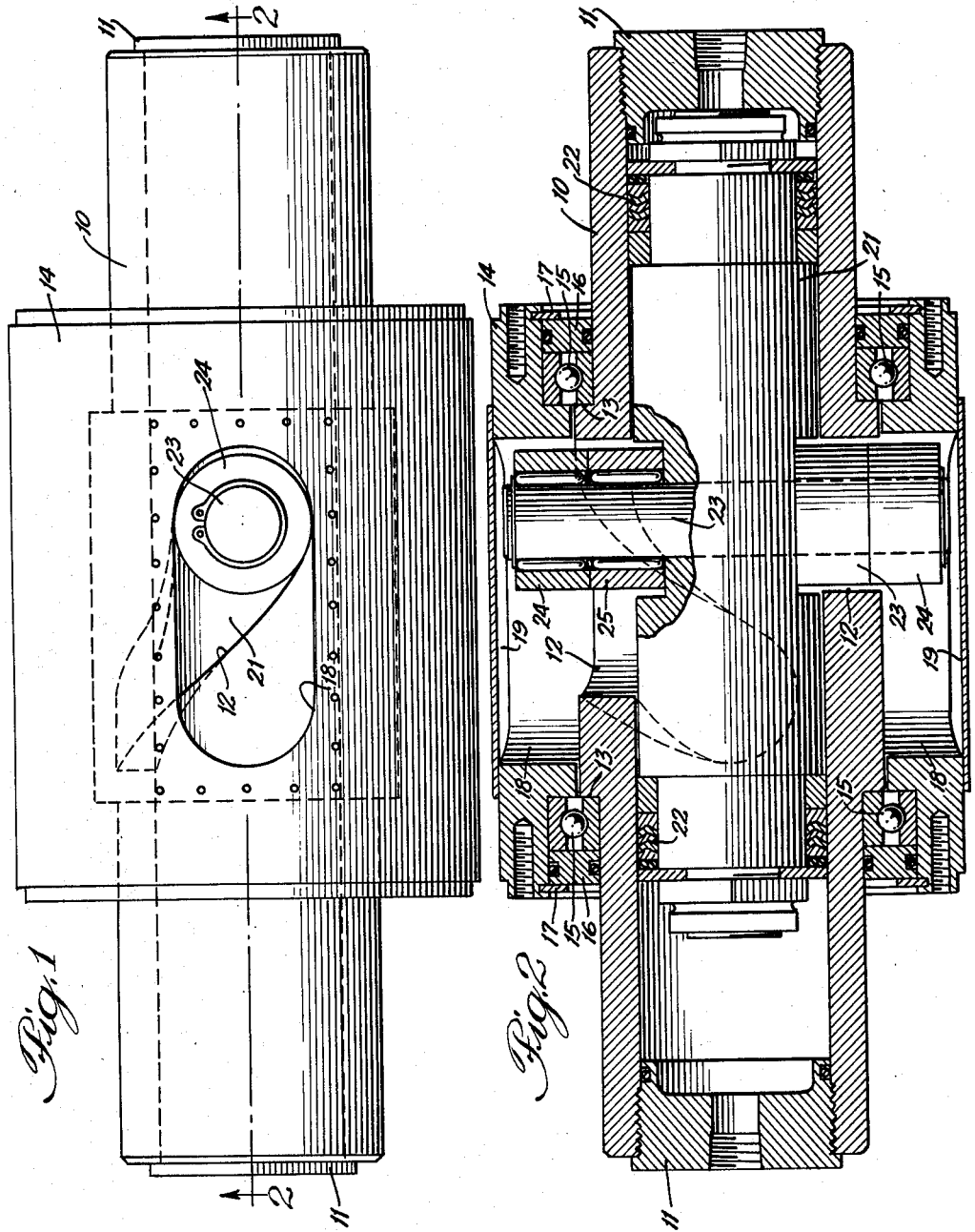

3,143,932
ROTARY ACTUATOR
Robert W. Lanman, Hammond, Ind., assignor to Carter Controls, Inc., Lansing, Ill., a corporation of Illinois
Filed Oct. 16, 1961, Ser. No. 145,285
4 Claims. (Cl. 92—31)

This invention relates to rotary actuators and more particularly to a fluid operated rotary actuator for producing rotary motion in response to an axial motion of a piston.

In rotary actuators, as heretofore constructed, the principal problems have been the effective sealing of the parts against fluid leakage and the development of high torque without excessive loading of the parts and binding. It is one of the objects of the present invention to provide a rotary actuator which overcomes these problems, which is easy to seal effectively against fluid leakage, and which is capable of developing very high torques without overloading or binding.

According to a feature of the invention an elongated cylindrical sleeve rotatably carries an external collar and an internal piston and a follower on the piston engages slots in the sleeve and collar which cross each other at an acute angle. Preferably one of the slots is helical and the other is an axially straight slot, although both slots could be helical if desired.

According to another feature of the invention, the piston is at least twice the axial length of the slots so that the ends of the piston never cross the slots whereby the piston may easily be slid in the sleeve.

The above and other objects and feaures of the invention will be more readily apparent from the following description when read in connection with the accompanying drawing, in which:

FIGURE 1 is a side elevation of a rotary actuator embodying the invention with a cover plate removed; and FIGURE 2 is an axial section on the line 2—2 of FIGURE 1.

The actuator, as shown, comprises an elongated sleeve or cylinder 10 which is closed at its ends by plugs 11. The plugs 11 are formed for connection to fluid pressure conduits leaving from a reversing valve, or the like, so that pressure may alternately be applied to opposite ends of the sleeve to cause selective longitudinal movement of the piston therein as described hereinafter.

In its central portion, the sleeve is formed with one or more helical slots 12 which in the construction shown extend through approximately 90°, although this angle could be increased or decreased as desired. Preferably the wall of the sleeve throughout the central portion in which the slots are formed is thickened, as shown, to leave upwardly facing shoulders 13.

A collar 14 having a length slightly in excess of the axial distance between the shoulders 13 is rotatably mounted on the sleeve. For this purpose, bearings 15 are fitted over the sleeve abutting against the shoulders 13 and are held in place by retaining and sealing rings 16 fitted into the ends of the collar 14 and secured therein against axial movement by snap rings, or similar fastenings, 17.

The collar 14 is provided with one or more axially extending slots 18 which are angularly spaced to register respectively with the helical slots 12 in the sleeve. Preferably the slots 18 are cut completely through the collar and are closed by cover plates 19 detachably secured over the outer surface of the collar.

An elongated cylindrical piston 21 is slidably mounted in the sleeve and is of a length at least twice the length of the axial slots 18. At its ends the piston carries seals 22 which seal against the inner surface of the sleeve 10 to prevent any leakage aroung the ends of the piston. By making the piston of a length at least twice the slot length, it can move through its full stroke without requiring that the seals cross the ends of the slots 12 so that the seals will not be damaged and will remain effective over a long period of use to prevent any leakage of actuating fluid.

Centrally of its length the piston carries one or more radially extending followers which extend into the respective slots 12 and 18 to cause the collar and sleeve to turn relative to each other as the piston is moved axially. As shown, the followers are formed by a pin 23 extending radially through the piston and projecting from the opposite ends thereof a distance approximately to the outer surface of the collar 14. Two rollers 24 and 25 are rotatably mounted on the projecting ends of the pin 23 and are positioned radially so that they will respectively engage the sides of the slots 18 and 12. The rollers 24 and 25 are rotatable independently of each other so as to eliminate any sliding or scraping over the side walls of the slots thereby minimizing friction and enabling the actuator unit to function more easily and with less loss of power.

If desired, the space around the piston between the seals thereon and the space within the collar around the rollers may be filled with lubricant. The seals retain the lubricant as well as keeping out dirt or other foreign material.

For using the actuator, fluid pressure may be applied to one end or the other of the sleeve to cause the piston to move axially in one direction or the other. As shown in FIGURES 1 and 2, the piston is moved to its extreme right hand position in which the rollers 24 and 25 lie in the extreme right hand ends of the slots 12 and 18. As the piston is moved to the left from this position, the piston and follower will be held against rotation relative to the collar 14 by engagement of the roller 24 in the axially extending slot 18. However, due to the helical angle of the slot 12, the sleeve will be turned relative to the collar as the piston travels axially. The amount of turning may be controlled by the helical angle of the slot 12 and the axial length thereof which are selected according to the surface requirements to produce the desired degree of rotation and the desired maximum torque.

In use the unit may be mounted either by securing the sleeve 10 to a fixed support and connecting the collar 14 to a part or device which is to be turned relative to the fixed support or vice versa. In either case, as the piston moves the device will be turned relative to the support through an angle proportional to the distance of travel of the piston. In this way, very accurate rotary movements can be produced with the necessary torque to accomplish the purpose.

While one embodiment of the invention has been shown and described herein, it will be understood that it is illustrative only and not to be taken as a definition of the scope of the invention, reference being had for this purpose to the appended claims.

What is claimed is:

1. A rotary actuator comprising an elongated cylindrical sleeve, a collar rotatably surrounding the sleeve, an elongated piston slidable in the sleeve, fluid pressure connections to the ends of the sleeve to supply and exhaust fluid to and from opposite ends of the sleeve to move the piston axially therein, the sleeve and collar being formed with slots extending generally axially thereof and which cross each other at an angle, the length of the slot in the sleeve being less than half the axial length of the piston whereby the ends of the piston will never cross the slot, one of the slots extending straight axially of the sleeve and collar and the other slot extending helically about the axis of the sleeve and collar through a portion only of the circumference thereof and a follower extending radially from the piston and extending into the crossing portions of the slots to cause relative rotation of the sleeve and collar as the piston moves.

2. The rotary actuator of claim 1 in which the follower comprises a radially extending pin and two rollers rotatably mounted on the pin and respectively engaging the slots in the sleeve and collar.

3. A rotary actuator comprising an elongated cylindrical sleeve having a helical slot in its central portion only extending through only a portion of the circumference of the sleeve, a collar rotatably mounted on the sleeve of a length to span the helical slot but shorter axially than the sleeve, means to hold the collar against axial movement on the sleeve, the collar having a straight axial slot therein crossing the slot in the sleeve, a piston slidable in the sleeve having an axial length at least twice the axial length of the slot therein, fluid pressure connections to the ends of the sleeve for applying fluid pressure thereto to move the piston axially in the sleeve, and a radially extending follower secured to the piston centrally of its length and fitting slidably in both of said slots to cause relative rotation of the sleeve and collar as the piston moves.

4. The rotary actuator of claim 3 in which the follower comprises a pin extending radially from the piston and a pair of rollers rotatable on the pin and engaging the slots respectively.

References Cited in the file of this patent

UNITED STATES PATENTS

| | | |
|---|---|---|
| 749,864 | James | Jan. 19, 1904 |
| 766,410 | Alger | Aug. 2, 1904 |
| 855,256 | Morey | May 28, 1907 |
| 1,053,799 | Eslick | Feb. 18, 1913 |
| 1,229,009 | Allison | June 5, 1917 |
| 2,315,775 | D'arcey | Apr. 6, 1943 |
| 2,898,750 | De Lorean | Aug. 11, 1959 |
| 2,974,646 | Miller et al. | Mar. 14, 1961 |

FOREIGN PATENTS

| | | |
|---|---|---|
| 65,815 | France | Jan. 12, 1865 |
| 227,351 | Germany | Mar. 3, 1910 |
| 161,017 | Sweden | June 10, 1953 |